(12) United States Patent
Lee et al.

(10) Patent No.: US 9,812,125 B2
(45) Date of Patent: Nov. 7, 2017

(54) SPEECH RECOGNITION DEVICE, VEHICLE HAVING THE SAME, AND SPEECH RECOGNITION METHOD

(71) Applicant: HYUNDAI MOTOR COMPANY, Seoul (KR)

(72) Inventors: Chang-Heon Lee, Yongin-si (KR); KyuSeop Bang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 181 days.

(21) Appl. No.: 14/562,243

(22) Filed: Dec. 5, 2014

(65) Prior Publication Data

US 2016/0027436 A1    Jan. 28, 2016

(30) Foreign Application Priority Data

Jul. 28, 2014    (KR) .................. 10-2014-0095891

(51) Int. Cl.
*G01L 15/00*    (2006.01)
*G10L 15/22*    (2006.01)
(Continued)

(52) U.S. Cl.
CPC ............. *G10L 15/22* (2013.01); *G10L 15/08* (2013.01); *G10L 15/02* (2013.01); *G10L 15/26* (2013.01);
(Continued)

(58) Field of Classification Search
CPC ....... G10L 15/22; G10L 15/30; G10L 15/265; G10L 25/87; G10L 15/04; G10L 15/20;
(Continued)

(56) References Cited

U.S. PATENT DOCUMENTS

| | | | | |
|---|---|---|---|---|
| 7,725,309 | B2 * | 5/2010 | Bedworth | G06F 17/2735 704/10 |
| 2006/0074651 | A1 * | 4/2006 | Arun | G10L 15/22 704/233 |

(Continued)

FOREIGN PATENT DOCUMENTS

| | | |
|---|---|---|
| JP | 10-039892 A | 2/1998 |
| JP | 2004-109563 A | 4/2004 |

(Continued)

OTHER PUBLICATIONS

Korean Office Action issued in Korean Application No. 10-2014-0095891 dated Aug. 27, 2015, with English Translation.

*Primary Examiner* — Vu B Hang
(74) *Attorney, Agent, or Firm* — McDermott Will & Emery LLP

(57) ABSTRACT

A speech recognition device is configured to increase usability by retrying speech recognition without returning to a previous operation or a re-input of speech when a user's speech is misrecognized. The speech recognition device is further configured increase accuracy of recognition by changing a search environment when the user's speech is misrecognized or when re-recognition is performed since the recognized speech is rejected due to a low confidence. A vehicle includes a speech input device configured to receive speech; and a speech recognition device configured to recognize the received speech and output a recognition result of the received speech. The speech recognition device resets a recognition environment applied to speech recognition and re-recognizes the received speech when a re-recognition instruction is input by a user, and resets the reset recognition environment to an initial value when the re-recognition is completed.

20 Claims, 13 Drawing Sheets

(51) Int. Cl.
*G10L 15/08* (2006.01)
*G10L 15/02* (2006.01)
*G10L 15/26* (2006.01)
*G10L 15/28* (2013.01)

(52) U.S. Cl.
CPC ............ *G10L 15/265* (2013.01); *G10L 15/28* (2013.01); *G10L 2015/228* (2013.01)

(58) Field of Classification Search
CPC ......... G10L 15/02; G10L 15/08; G10L 15/12; G10L 15/00; G10L 15/1815; G10L 25/78; G10L 13/07; G10L 13/08; G10L 13/043; G10L 15/10
USPC .......................................... 704/231, 243, 244
See application file for complete search history.

(56) References Cited

U.S. PATENT DOCUMENTS

| | | | | |
|---|---|---|---|---|
| 2011/0112839 | A1* | 5/2011 | Funakoshi | ............ G10L 15/083 704/249 |
| 2015/0019227 | A1* | 1/2015 | Anandarajah | ........... G10L 15/22 704/257 |

FOREIGN PATENT DOCUMENTS

| | | |
|---|---|---|
| JP | 2004-333703 A | 11/2004 |
| JP | 2008-097082 A | 4/2008 |
| KR | 10-1997-0037027 B1 | 3/2005 |
| KR | 10-0738414 B1 | 7/2007 |
| KR | 10-2013-0063091 A | 6/2013 |
| WO | 2009/008115 A1 | 1/2009 |

\* cited by examiner

"Call James"

FIG. 9

| INSTRUCTION CANDIDATES | CONFIDENCE |
|---|---|
| Jane | 95 |
| Jason | 93 |
| John | 85 |
| Johnson | 83 |
| Jay | 82 |
| James | 78 |
| Jamie | 76 |
| Jeremy | 72 | threshold down ⟹ threshold:80
⇩
threshold:75

| INSTRUCTION CANDIDATES | CONFIDENCE |
|---|---|
| Jane | 95 |
| Jason | 93 |
| John | 85 |
| Johnson | 83 |
| Jay | 82 |
| James | 78 |
| Jamie | 76 |
| Jeremy | 72 |

"Re-Searching"

SPEECH RECOGNITION DEVICE, VEHICLE HAVING THE SAME, AND SPEECH RECOGNITION METHOD

CROSS-REFERENCE TO RELATED APPLICATION

This application claims the benefit of Korean Patent Application No. P2014-95891 filed on Jul. 28, 2014 in the Korean Intellectual Property Office, the disclosure of which is incorporated herein by reference.

BACKGROUND

1. Field

Present disclosure relates to a speech recognition device configured to recognize a user's speech, a vehicle configured to perform a specific function according to the recognized speech using the same, and a speech recognition method.

2. Description of the Related Art

As vehicle technology develops, various functions for user convenience are being provided in addition to a default driving function performed by vehicles. As functions that can be performed by vehicles become diverse in this way, users' manipulation loads increase. An increase in manipulation loads decreases concentration on driving, which interferes with safe driving. Also, users who lack experience in manipulating devices do not properly use functions that can be performed by vehicles.

Therefore, research and development for user interfaces for decreasing users' manipulation loads are necessary. Particularly, applying speech recognition technology for recognizing users' speech and performing functions corresponding to the speech to vehicles is expected to enable an effective decrease in users' manipulation loads.

SUMMARY

According to an aspect of the present disclosure, there is provided a vehicle. The vehicle includes a speech input device configured to receive speech; and a speech recognition device configured to recognize the received speech and output a recognition result of the received speech, wherein the speech recognition device resets a recognition environment applied to speech recognition and re-recognizes the received speech when a re-recognition instruction is input by a user, and resets the reset recognition environment to an initial value when the re-recognition is completed.

The speech recognition device may search for at least one instruction corresponding to the received speech, and output an instruction having a confidence score greater than a predetermined threshold value among the found instructions as the recognition result.

The recognition environment may include at least one of an accuracy parameter related to accuracy of speech recognition, a threshold value of the confidence score, and a search range.

The accuracy parameter may represent information on the number of search nodes, and accuracy of speech recognition may increase as the number of search nodes increases.

The speech recognition device may reset the accuracy parameter to be higher.

The speech recognition device may reset the threshold value of the confidence score to be smaller.

The speech recognition device may exclude a recognition result output before the re-recognition instruction is input from a search range when the re-recognition is performed.

The speech recognition device may convert the received speech into speech data, detect end point information from the speech data to determine a speech section, and extract a feature vector from the speech section, and may further include a memory configured to store the detected end point information and the extracted feature vector.

When the re-recognition instruction is input by the user, the speech recognition device may re-recognize the received speech using the end point information and feature vector stored in the memory.

When there is no instruction having the confidence score greater than the predetermined threshold value among the found instructions, the speech recognition device may reset the recognition environment applied to speech recognition and recognize speech re-input by the user according to the reset recognition environment.

The recognition environment may include an accuracy parameter related to accuracy of speech recognition and the threshold value of the confidence score.

According to another aspect of the present disclosure, there is provided a speech recognition device. The device includes a memory configured to store information on input speech; and a speech recognition device configured to recognize the input speech and output a recognition result of the input speech, wherein the speech recognition device resets a recognition environment applied to speech recognition and re-recognizes the input speech when a re-recognition instruction is input by a user, and resets the reset recognition environment to an initial value when the re-recognition is completed.

The speech recognition device may search for at least one instruction corresponding to the input speech, and output an instruction having a confidence score greater than a predetermined threshold value among the found instructions as the recognition result.

The recognition environment may include at least one of an accuracy parameter related to accuracy of speech recognition, a threshold value of the confidence score, and a search range.

The accuracy parameter may represent information on the number of search nodes, and accuracy of speech recognition may increase as the number of search nodes increases.

The speech recognition device may reset the accuracy parameter to be higher.

The speech recognition device may reset the threshold value of the confidence score to be smaller.

The speech recognition device may exclude a recognition result output before the re-recognition instruction is input from a search range when the re-recognition is performed.

The speech recognition device may detect end point information from the speech data to determine a speech section, and extract a feature vector from the speech section, and information on the input speech may include the detected end point information and the extracted feature vector.

When the re-recognition instruction is input by the user, the speech recognition device may re-recognize the input speech using the end point information and feature vector stored in the memory.

According to still another aspect of the present disclosure, there is provided a speech recognition method. The method includes recognizing input speech when speech is input; outputting a recognition result of the input speech; when a re-recognition instruction is input by a user, resetting a recognition environment including at least one of an accuracy parameter related to accuracy of speech recognition, a threshold value of a confidence score, and a search range; and recognizing the input speech again by applying the reset recognition environment.

The method may further include resetting the reset recognition environment to an initial value again when the re-recognition is completed.

The accuracy parameter may represent information on the number of search nodes, and accuracy of speech recognition may increase as the number of search nodes increases.

The resetting of the recognition environment may include resetting the accuracy parameter to be higher.

The resetting of the recognition environment may include resetting the threshold value of the confidence score to be smaller.

The resetting of the recognition environment may include excluding a recognition result output before the re-recognition instruction is input from a search range when the re-recognition is performed.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a diagram illustrating a case in which a threshold value of a confidence score is reset to be smaller;

DETAILED DESCRIPTION

The present disclosure describes a speech recognition device configured to increase usability by retrying speech recognition without returning to a previous operation or a re-input of speech when a user's speech is misrecognized. The speech recognition device may also be configured to increase accuracy of recognition by changing a search environment when the user's speech is misrecognized or when re-recognition is performed since the recognized speech is rejected due to a low confidence. Hereinafter, embodiments of a vehicle and a method of controlling the same will be described in detail with reference to the accompanying drawings.

Figure 1:
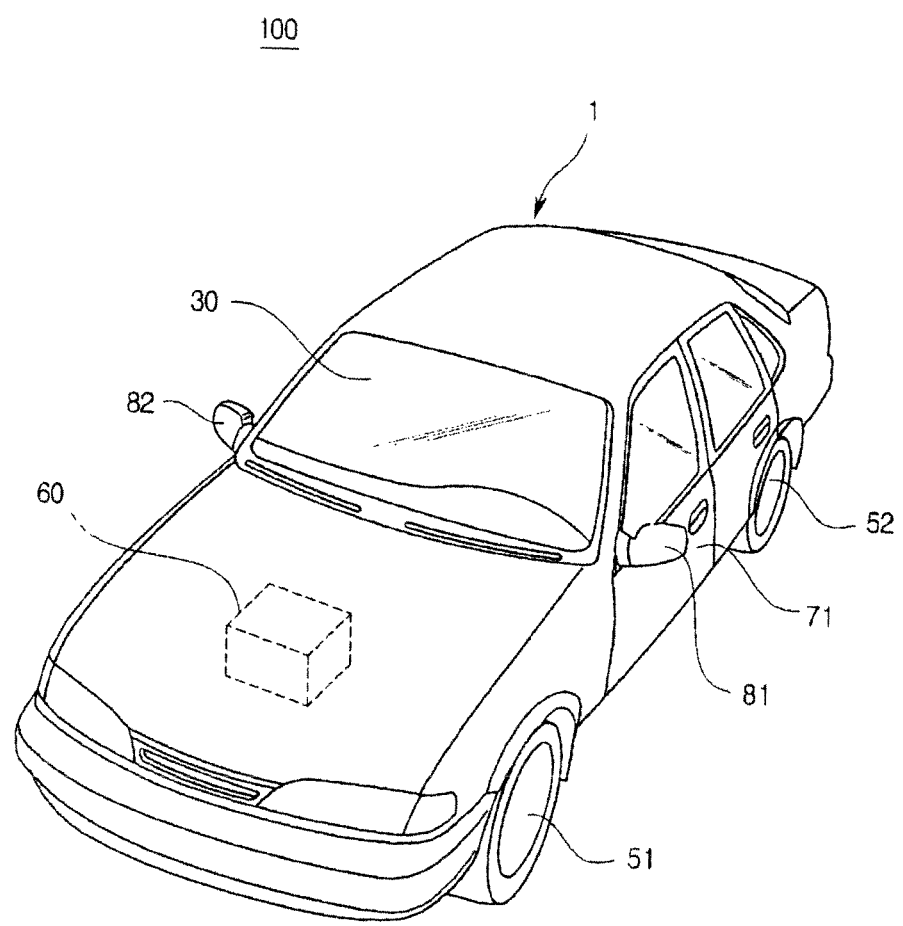
FIG. 1 is a diagram illustrating an appearance of a vehicle seen from the outside according to an embodiment.
Figure 2:
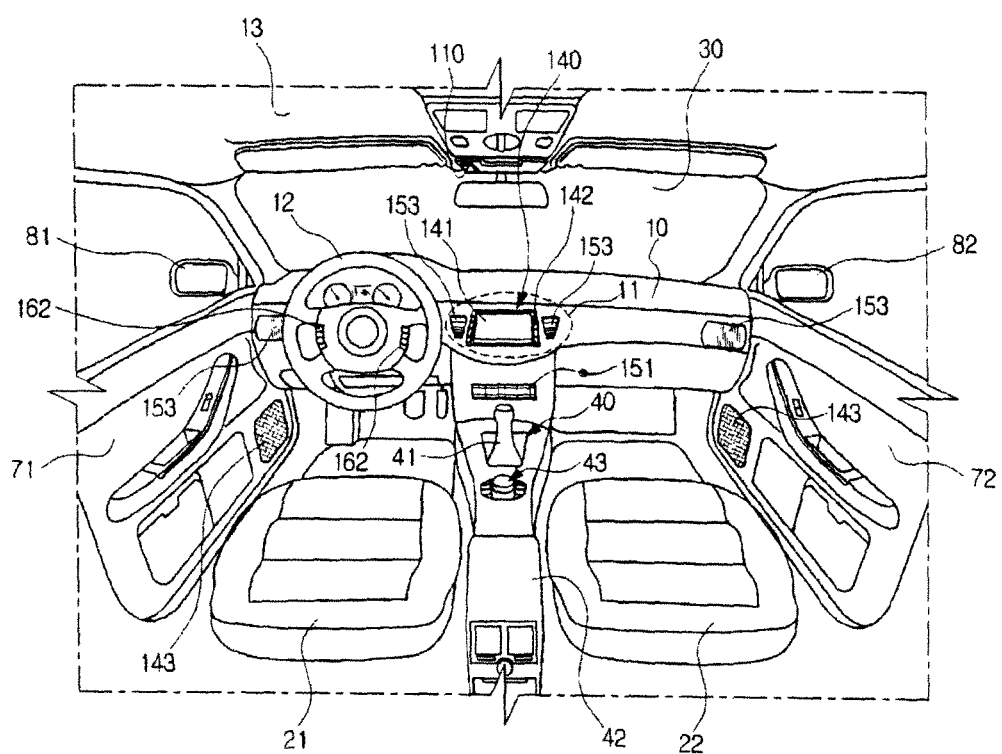
FIG. 2 is a diagram illustrating an internal configuration of a vehicle according to an embodiment.

FIG. 1 is a diagram illustrating an appearance of a vehicle seen from the outside according to an embodiment. FIG. 2 is a diagram illustrating an internal configuration of a vehicle according to an embodiment.

As illustrated in FIG. 1, a vehicle 100 according to an embodiment includes a main body 1 forming an appearance of the vehicle 100, wheels 51 and 52 moving the vehicle 100, a driving device 60 rotating the wheels 51 and 52, doors 71 and 72 (refer to FIG. 2) shielding an inside of the vehicle 100 from the outside, a front glass 30 providing a field of view in front of the vehicle 100 to a driver in the vehicle 100, and side mirrors 81 and 82 providing a field of view behind the vehicle 100 to the driver.

The wheels 51 and 52 include the front wheels 51 provided in the front of the vehicle and the rear wheels 52 in the rear of the vehicle. The driving device 60 provides rotary power to the front wheels 51 or the rear wheels 52 such that the main body 1 moves forward or backward. The driving device 60 may include an engine configured to combust fossil fuels and generate rotary power or a motor configured to receive power from a condenser (not illustrated) and generate rotary power.

The doors 71 and 72 are pivotally provided on left and right sides of the main body 1. When the doors are opened, the driver may enter the vehicle 100. When the doors are closed, the doors shield the inside of the vehicle 100 from the outside. The front glass 30 is provided in the upper front of the main body 100 and enables the driver in the vehicle 100 to obtain visual information from the front of the vehicle 100, and is also called a windshield glass.

The side mirrors include the left side mirror 81 provided on the left side of the main body 1 and the right side mirror 82 provided on the right side thereof. The side mirrors 81 and 82 allow the driver in the vehicle 100 to obtain visual information from the sides and rear of the vehicle 100.

The vehicle 100 may further include a detecting device such as a proximity sensor configured to detect a rear or side obstacle or other vehicles, and a rain sensor configured to detect rainfall and precipitation. The proximity sensor may transmit a detection signal to a side or a rear of the vehicle and receive a reflection signal reflected from an obstacle such as another vehicle. The obstacle at the side or rear of the vehicle 100 may be detected and a location of the obstacle may be detected based on a waveform of the received reflection signal. As an example of such a proximity sensor, a method in which an ultrasound or infrared light is transmitted and a distance to an obstacle is detected using an ultrasound or infrared right reflected from the obstacle may be used.

An internal structure of the vehicle 100 will be described with reference to FIG. 2.

An audio video navigation (AVN) display 141 and an AVN input device 142 may be provided in a center fascia 11 located in a center area of a dashboard 10. An AVN device 140 can integrally perform audio, video, and navigation functions. The AVN display 141 may selectively display at least one of an audio screen, a video screen, and a navigation screen, and may display various control screens related to control of the vehicle 100 or a screen related to an additional function that can be executed in the AVN device 140.

The AVN display 141 may be implemented by a liquid crystal display (LCD), a light emitting diode (LED), a plasma display panel (PDP), an organic light emitting diode (OLED), a cathode ray tube (CRT), and the like. A user may manipulate the AVN input device 142 to input an instruction for controlling the AVN 140. As illustrated in FIG. 2, the AVN input device 142 in the form of a hard key may be provided in a region adjacent to the AVN display 141. When the AVN display 141 is implemented in the form of a touchscreen, the AVN display 141 may also perform functions of the AVN input device 142.

A speaker 143 configured to output a sound may be provided in the vehicle 100. Sound necessary for performing an audio function, a video function, a navigation function, and other functions may be output through the speaker 143.

A steering wheel 12 is provided in the dashboard 10 at the side of a driver's seat 21. A wheel input device 162 is provided in the steering wheel 12 and a driver may input an instruction related to control of the vehicle 100 without removing his or her hands from the steering wheel 12 while driving.

Meanwhile, a center input device 43 in the form of a jog shuttle or a hard key may be provided in a center console 40. The center console 40 refers to a part positioned between the driver's seat 21 and a passenger's seat 22 and in which a gear manipulation lever 41 and a tray 42 are formed. The center input device 43 may perform all or some functions of the AVN input device 142 or all or some functions of the wheel input device 162.

An air conditioning system for heating and cooling is provided in the vehicle 100. The air conditioning system may control a temperature in the vehicle 100 by discharging heated or cooled air through a ventilation opening 153. A user instruction for controlling a temperature may be input through an air conditioning input device 151.

The vehicle 100 according to the embodiment may receive a control instruction input by the user by manipulating the AVN input device 142, the wheel input device 162, the center input device 43, or the like as the user's speech through a speech input device 110.

In order to effectively input speech, as illustrated in FIG. 2, the speech input device 110 may be mounted in a headlining 13, but the embodiment of the vehicle 100 is not limited thereto. The speech input device 110 may be mounted above the dashboard 10 or in the steering wheel 12. In addition, the speech input device 110 may be mounted in any position without limitations as long as it can receive the user's speech while the user is within the vehicle.

The basic appearance and the internal structure that can be included in the vehicle 100 have been described in FIGS. 1 and 2. Hereinafter, a process of speech recognition performed by the vehicle 100 will be described in detail.

Figure 3:
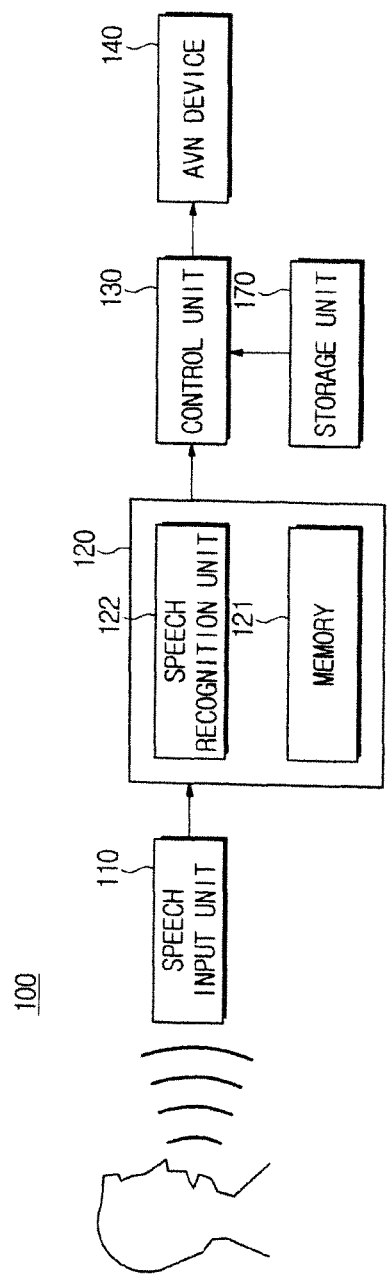
FIG. 3 is a control block diagram of a vehicle according to an embodiment.

FIG. 3 is a control block diagram of a vehicle according to an embodiment. As illustrated in FIG. 3, the vehicle 100 includes the speech input device 110 configured to receive the user's speech, a speech recognition device 120 configured to recognize the user's input speech, a control device 130 configured to perform control such that an event corresponding to the recognized speech is executed, and a storage device 170 configured to store an instruction and an event corresponding thereto. In the embodiment of the disclosed disclosure, the user includes a driver and a passenger on board in the vehicle 100.

The speech input device 110 may include a microphone. When the user's uttered speech is input, the speech input device 110 converts the speech into an electrical signal, and outputs the signal to the speech recognition device 120. In the embodiment to be described below, the electrical signal converted in the speech input device 110 will be referred to as speech data.

The speech recognition device 120 may recognize the user's speech by applying a speech recognition algorithm or a speech recognition engine to speech data input from the speech input device 110. In this case, the speech data may be converted into the form that is more useful for speech recognition. The speech recognition device 120 converts the input speech data from an analog form to a digital form, detects a start point and an end point of speech, and detects an actual speech section included in the speech data. This is called end point detection (EPD). Then, feature vector extracting technology such as a cepstrum, a linear predictive coefficient (LPC), a Mel-frequency cepstral coefficient (MFCC), or filter bank energy is applied to the detected section and therefore a feature vector of the speech data may be extracted.

The speech recognition device 120 includes a memory 121 configured to store data and a speech recognition device 122 configured to perform speech recognition using the speech recognition engine. Information on the end point and the feature vector of the speech data are stored in the memory 121. Also, a recognition result may be obtained by comparing the extracted feature vector and a trained reference pattern. For this purpose, an acoustic model in which signal characteristics of speech are modeled and compared, and a language model in which a linguistic sequence relation of words or syllables corresponding to a recognized vocabulary is modeled may be used.

The acoustic model may be further classified as a direct comparison method in which a recognition target is set as a feature vector model and is compared with a feature vector of speech data, or a statistical method in which a feature vector of the recognition target is statistically processed and used.

The direct comparison method is a method in which a unit of a word, a phoneme, and the like to be recognized is set as a feature vector model, and a similarity with input speech is compared. A representative method thereof includes a vector quantization method. According to the vector quantization method, a feature vector of the input speech data is mapped to a codebook serving as a reference model, encoded as a representative value, and these code values are compared with each other.

The statistical model method is a method in which a unit of the recognition target is configured as a state sequence, and a relation between the state sequences is used. The state sequence may include a plurality of nodes. The method of using the relation between the state sequences includes methods using dynamic time warping (DTW), a hidden Markov model (HMM), a neural network, and the like.

The dynamic time warping is a method of compensating for a difference in a time axis in comparison with the reference model in consideration of a dynamic characteristic of speech, in which a signal length is changed over time even when the same person produces the same utterance. The hidden Markov model is recognition technology in which speech is assumed as a Markov process having a state transition probability and an observation probability of a node (an output symbol) in each state, the state transition probability and the observation probability of the node are estimated through learning data, and a probability of the input speech being generated in the estimated model is calculated.

Meanwhile, in the language model in which a linguistic sequence relation such as a word or a syllable is modeled, a sequence relation between units forming the language is applied to units obtained in speech recognition. Therefore, it is possible to reduce acoustic ambiguity and recognition errors. The language model includes a statistical language model and a model based on a finite state automata (FSA). The statistical language model uses a chain rule probability of a word such as Unigram, Bigram, and Trigram.

The speech recognition device 120 may use any of the above-described methods in order to recognize speech. For example, the acoustic model to which the hidden Markov model is applied or an N-best search method in which the acoustic model and the speech model are integrated may be used. The N-best search method may improve recognition performance by selecting N recognition result candidates using the acoustic model and the language model, and then re-evaluating a rank of these candidates.

The speech recognition device 120 may calculate a confidence score in order to ensure confidence of the recognition result. The confidence score is an index indicating credibility of the speech recognition result, and may be defined as a relative value of a probability of other phonemes or words having been uttered, with respect to a phoneme or a word recognized as the result. Therefore, the confidence score may be represented as a value between 0 and 1, or a value between 0 and 100. When the confidence score is greater than a predetermined threshold value, the recognition result may be accepted, and otherwise, the recognition result may be rejected.

When the confidence score is greater than the threshold value but feedback indicating that recognition is wrong is received from the user (e.g., in the event of misrecognition), the speech recognition device 120 performs re-recognition. In this case, when the same recognition environment as in the previous recognition is applied, the recognition result is less likely to improve. Therefore, the speech recognition device 120 sets the recognition environment different from the previous recognition environment and performs speech recognition again.

Also, since the previous recognition result is not the result desired by the user, the speech recognition device 120 may exclude the previous recognition result from a search range of the re-recognition process. In this case, since the search range decreases, a time taken for searching may be reduced. Detailed operations of performing speech re-recognition in the speech recognition device 120 will be described below.

The speech recognition device 120 may be implemented in a computer-readable recording medium using software, hardware, or a combination thereof. According to hardware implementation, at least one of electrical units such as application specific integrated circuits (ASICs), digital signal processors (DSPs), digital signal processing devices (DSPDs), programmable logic devices (PLDs), field programmable gate arrays (FPGAs), processors, micro-controllers, and micro-processor may be used for implementation.

According to software implementation, a separate software module configured to perform at least one function or operation may be implemented together, and a software code may be implemented by a software application written in an appropriate program language.

Since the user's uttered speech may include an instruction for controlling the vehicle, the storage device 170 may store in advance the instruction and an event corresponding thereto. Also, a program for processing and controlling the speech recognition device 120 or the controller 130 may be stored, and a function for temporarily storing input/output data may be performed.

The storage device 170 may include at least one storage medium among a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disc.

The controller 130 may provide the speech recognition result in the speech recognition device 120 to the user through the AVN display 141 or the acoustic output device 143. As an example, there is a method in which recognition result candidates having the confidence score greater than the threshold value among N recognition result candidates are provided.

Also, the controller 130 performs control for generating an event corresponding to an instruction recognized by the speech recognition device 120. For example, according to the recognized instruction, calling a specific person may be performed, a navigation function may be controlled, or an audio function may be controlled. Also, a temperature in the vehicle 100 may be controlled using a vehicle air conditioning system.

Similar to the speech recognition device 120, the controller 130 may be implemented in the computer-readable recording medium using software, hardware, or a combination thereof.

Figure 4:
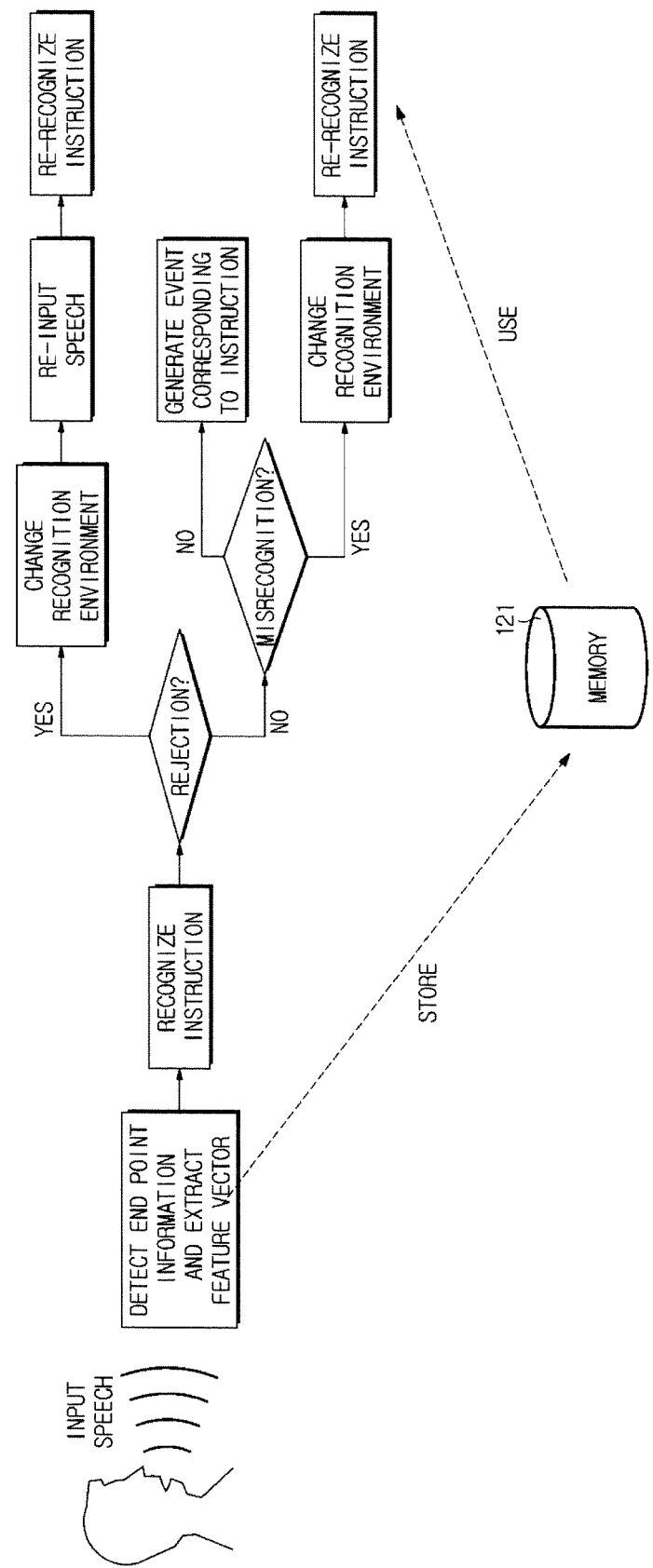
FIG. 4 is a flowchart illustrating a process of speech recognition performed by a speech recognition device of a vehicle according to an embodiment.
Figure 5:
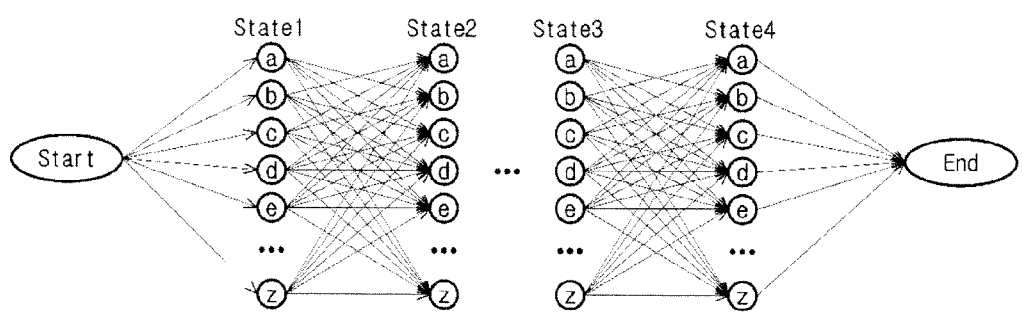
FIG. 5 is a diagram illustrating operations of differently setting an accuracy parameter when a speech recognition algorithm is applied.

FIG. 4 is a flowchart illustrating a process of speech recognition performed by a speech recognition device of a vehicle according to an embodiment. FIG. 5 is a diagram illustrating operations of differently setting an accuracy parameter when a speech recognition algorithm is applied.

As illustrated in FIG. 4, when the user's speech is input, the speech recognition device 120 detects end point information from the user's speech data and extracts the feature vector. The end point information and the feature vector are stored in the memory 121. Also, an instruction corresponding to the user's speech data is searched for using the extracted feature vector. As described above, according to the N-best search method, N instruction candidates may be searched for and the confidence score of each of the N instruction candidates is calculated.

When there is no instruction having the confidence score greater than the predetermined threshold value among the N instruction candidates, it may be impossible to ensure confidence of the recognition result. Therefore, the recognition result is rejected. When there is an instruction having the confidence score greater than the predetermined threshold value among the N instruction candidates, a list of the instruction candidates may be provided to the user. This may be a final recognition result of the input speech.

When the instruction candidate list provided to the user includes an instruction desired by the user (e.g., when speech recognition is correctly performed), an event corresponding to the input instruction is generated. However, when the provided instruction candidate list does not include an instruction desired by the user, since this is misrecognition, the user provides a notification that the recognition result is incorrect through feedback.

In the related art, upon occurrence of a misrecognition, a cumbersome process was performed such that the process returned to the previous operation again and the user's speech was re-input. However, in the vehicle 100 according to the embodiment, when the user instructs re-recognition, the instruction may be searched again using the feature vector stored in the memory 121 without a re-input of the user's speech.

As an exemplary method of instructing re-recognition, the user may utter an instruction corresponding to re-recognition and input through the speech input device 110. The instruction corresponding to re-recognition may be variously set in consideration of usability and recognition performance.

Also, re-recognition may be instructed by manipulating the input device 142, 162, or 43 provided in the vehicle 100.

The speech recognition device 120 changes the recognition environment before the instruction is re-recognized. Therefore, it is possible to prevent occurrence of the same recognition result and further enhance recognition performance. Specifically, in order to further increase recognition accuracy, search parameters (or engine parameters) may be updated and automatically reset. As an example, the search parameters may include the accuracy parameter. As the accuracy parameter is set to be higher, recognition accuracy increases. Therefore, the speech recognition device 120 may reset the accuracy parameter to be higher before the instruction is re-recognized.

When the instruction is searched for using the hidden Markov model, the speech recognition device 120 estimates a state transition probability of n states formed of a plurality of nodes and an observation probability of nodes, and computes a probability of the input speech being generated in the estimated model.

Each node may represent a phoneme, n, the number of states, may represent the number of phonemes forming a word. For example, as illustrated in FIG. 5, when the number of total nodes for each state is 26 and full search is performed, $26^n$ searches are taken for computing a transition probability to an n-th state. In this case, search accuracy increases, but a search rate decreases. The accuracy parameter may include the number of search nodes used for speech recognition.

In order to perform rapid search, an initial value of the number of search nodes may be limitedly set. For example, the initial value of the number of search nodes may be decreased and set to 5 or 10, that is, a value smaller than 26. Therefore, it is possible to reduce a time taken for searching and quickly obtain the recognition result.

However, when the previous recognition result was incorrect, accurate recognition is more important than rapid recognition. Therefore, when a re-recognition instruction is input, the speech recognition device 120 increases the number of search nodes and therefore recognition accuracy may be increased. Accordingly, when information of previously input speech data is used without the instruction re-input by the user, a different recognition result may be obtained.

Also, since instruction candidate list that is previously recognized and provided to the user does not include the instruction desired by the user, when re-recognition is performed, the instruction candidate list previously recognized is excluded from the search range. Since the search range is reduced, it is possible to decrease a time taken for searching.

The N instruction candidates are searched for according to the reset accuracy parameter, the confidence score of each of the candidates is computed and compared with the threshold value, and a final instruction candidate list to be provided to the user is extracted. In this case, the speech recognition device 120 may also reset the threshold value. According to the user's utterance state or a speech input environment such as an ambient environment, although an accurate recognition result that is the same as the user's utterance is obtained, since the computed confidence score is the predetermined threshold value or less, the result may be excluded from the final instruction candidate list. Also, since the threshold value is not a value set by an experiment or statistics, it may be incorrect.

Therefore, the speech recognition device 120 may reset the threshold value to be compared with the confidence score to a value less than an initial setting value and therefore much more instruction candidates may be shown to the user.

Referring again to FIG. 4, when the result is rejected since there is no instruction having the confidence score greater than the predetermined threshold value among the N instruction candidates, speech is re-input by the user and re-recognition is performed. In this case, the speech recognition device 120 may reset at least one of the accuracy parameter and the threshold value of the confidence score.

When the recognition result is rejected or the re-recognition instruction is input by the user, the accuracy parameter or the threshold value of the confidence score is reset or the previous recognition result is excluded from the search range to perform re-recognition, and then the recognition environment is initialized again. When the accuracy parameter is increased, the parameter is reset to the preset initial value again after the re-recognition. When the threshold value of the confidence score is reset, the value is reset to the preset initial value again after the re-recognition.

Also, when the previous recognition result is excluded from the search range, the result is included again after the re-recognition.

Meanwhile, even when the speech recognition device 120 does not apply the N-best search method, the above-described re-recognition method may be applied in the same manner. For example, a final instruction candidate corresponding to the recognition result may be provided to the user. In this case, the user finally confirms the speech recognition result, rather than selecting any of several candidates similar to a case in which the N-best search method is applied.

In this case, when the user inputs the re-recognition instruction, as described above, the accuracy parameter may be reset to be higher, and the threshold value of the confidence score may be reset to be smaller. Also, the final instruction candidate serving as the previous recognition result is excluded from the search range. Also, after the re-recognition is completed, the reset parameter and threshold value are reset to the initial value again, and the excluded final instruction candidate is included in the search range again.

Hereinafter, operations of the vehicle 100 recognizing the user's speech will be described in detail with reference to detailed examples.

Figure 6:
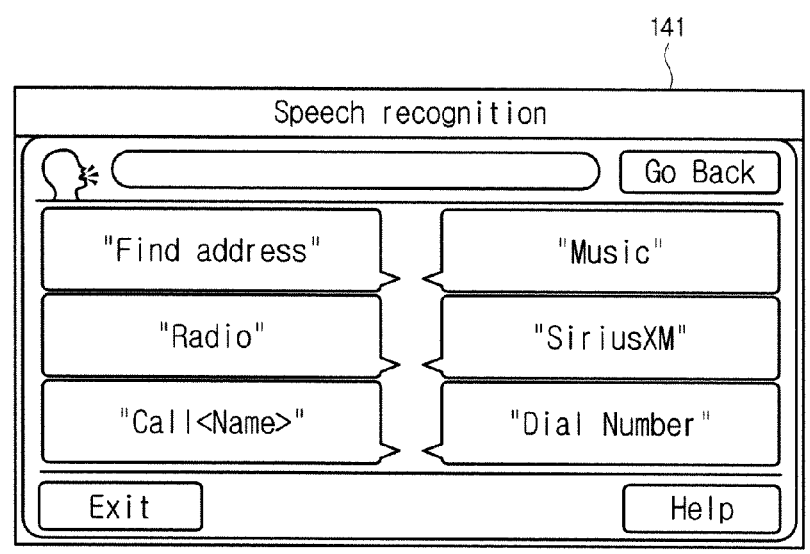
FIG. 6 is a diagram illustrating an exemplary screen that can be displayed on an AVN display when speech recognition is initially executed.
Figure 6:
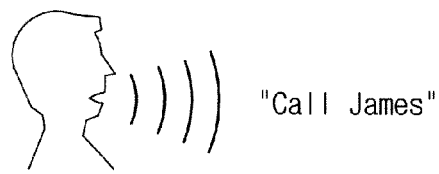
Figure 7:
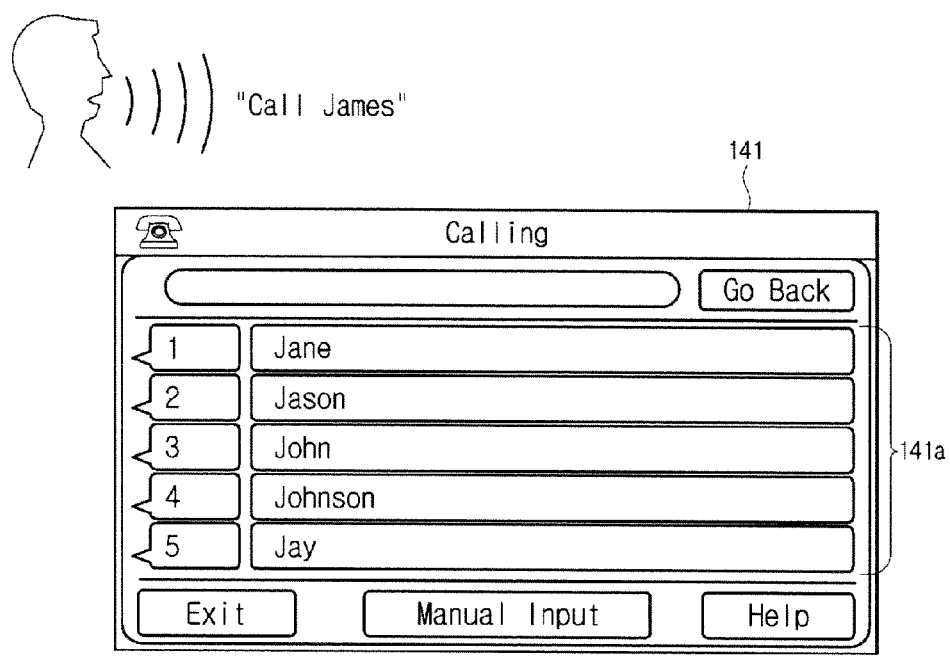
FIGS. 7 and 8 are diagrams illustrating an exemplary screen that can be displayed on an AVN display according to a user's utterance.
Figure 8:
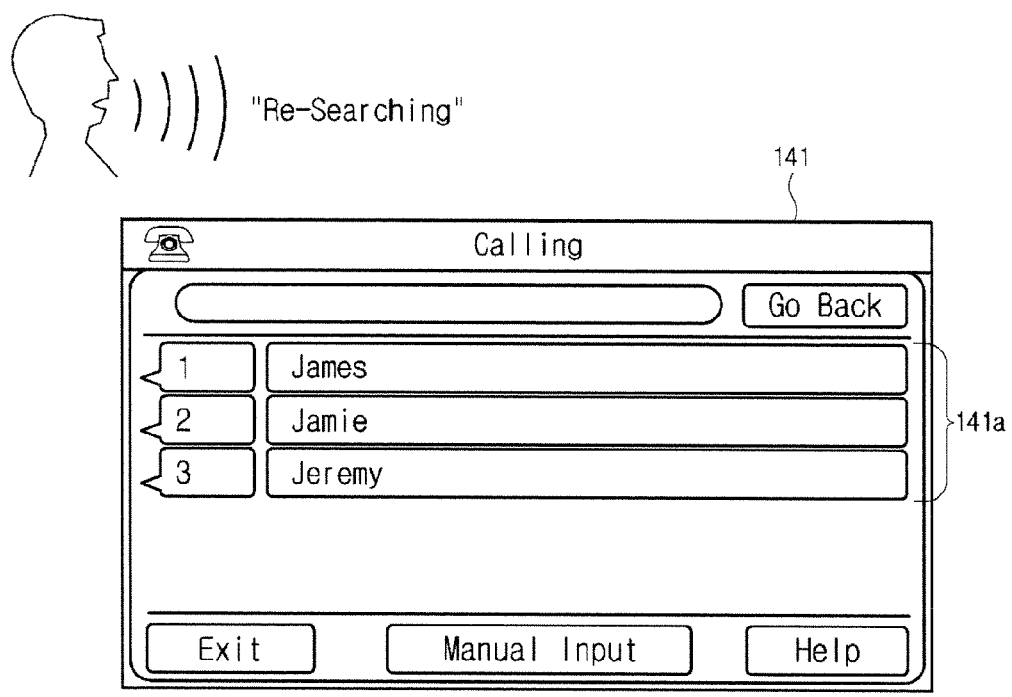

FIG. 6 is a diagram illustrating an exemplary screen that can be displayed on an AVN display when speech recognition is initially executed. FIGS. 7 and 8 are diagrams illustrating an exemplary screen that can be displayed on an AVN display according to the user's utterance.

A speech recognition executing instruction may be input by the user. When the speech recognition executing instruction is input, the vehicle 100 may perform speech recognition. For example, the user may input the speech recognition executing instruction by manipulating the input device 162 provided in the steering wheel 12, but the embodiment of the vehicle 100 is not limited thereto. In order to input the speech recognition executing instruction, the AVN input device 142 may be manipulated or the jog shuttle 43 may be manipulated.

When the speech recognition executing instruction is input, speech recognition is awaited. For example, the speech input device 110 is turned on and is in a state in which the user's speech may be received. As illustrated in FIG. 6, it is possible to help the user's utterance by displaying frequently used instructions on the AVN display 141.

As an example, in order for the user to call, as illustrated in FIG. 6, when an instruction "Call James" is uttered and input to the speech input device 110, the speech recognition device 120 performs speech recognition as described above in order to recognize "Call" and "James".

The instruction "Call" may be mapped to a call event and stored, and a call recipient is the following <Name>. A name and a phone number may be mapped and stored in the storage device 170. When the speech recognition device 120 recognizes "Call" and "James," the controller 130 may perform control such that the AVN device 140 calls a phone number that is mapped with "James" and stored.

When the speech recognition device 120 recognizes "Call," a word corresponding to the following <Name> may be searched for according to the N-best search method, and provided as an N-best list 141a, as illustrated in FIG. 7. Words included in the N-best list correspond to instruction candidates, and correspond to candidates of the call recipient <Name> in this example.

Meanwhile, only candidates of <Name> that are mapped to phone numbers and stored in the storage device 170 may be displayed on the AVN display 141. Even when candidates are not mapped to the phone number and stored in the storage device 170, if the candidates are displayed first and then finally selected by the user, it is possible to provide a notification that there is no phone number mapped thereto and stored.

As illustrated in FIG. 7, the user utters the instruction "Call James," but "James" is not included in the N-best list 141a displayed on the AVN display 141. That is, this corresponds to a case in which the final recognition result of the speech recognition device 120 is incorrect, and the user provides feedback indicating misrecognition.

As an example, as illustrated in FIG. 8, an instruction "Re-searching" may be uttered and input to the speech input device 110. "Re-searching" is an example of the instruction mapped to the re-recognition instruction. In addition, in consideration of usability of the user and recognition performance of the speech recognition engine, various instructions may be set as the re-recognition instruction.

When the speech recognition device 120 recognizes the instruction "Re-searching," speech recognition for "James" is performed again. Since the speech data uttered first by the user and stored in the memory 121 may be used again, there is no need to re-input the user's speech.

In order to further increase recognition accuracy, the speech recognition device 120 updates and automatically resets search parameters (or engine parameters). As described above, the accuracy parameter including the number of search nodes may be reset to be higher. Also, the threshold value of the confidence score may be reset to be smaller. As exemplified in FIG. 9, a case in which other recognition environments are not changed but only the threshold value of the confidence score is reset to be smaller will be described.

As exemplified in FIG. 9, the instruction "James" uttered by the user is searched for, but the threshold value of the confidence score is set to 80 with respect to 100, and only instruction candidates of "Jane," "Jason," "John," "Johnson," and "Jay" having the confidence score greater than 80 may be provided to the user as the final recognition result. That is, there may be a case in which an actually input instruction has a low confidence score according to the speech input environment.

In this case, as illustrated in FIG. 9, when the threshold value of the confidence score is decreased to 75, much more instruction candidates may be provided to the user, "James" may be included therein, and a correct recognition result may be finally provided.

Meanwhile, the previous final recognition result may be excluded from the search range. According to the example in FIG. 8, since "Jane," "Jason," "John," "Johnson," and "Jay" are not the instruction desired by the user, these will be excluded from the search range when re-recognition is performed. Since the search range is decreased, it is possible to decrease a time taken for searching.

As described above, when the speech recognition device 120 performs re-recognition, as illustrated in FIG. 8, the re-recognition result may be displayed on the AVN display 141, "James" uttered by the user is included in the N-best list 141a representing the re-recognition result, and a correct recognition result may be provided to the user.

The user may utter "James" or a number "1" that is assigned to "James" and input to the speech input device 110. The controller 130 may perform control such that the AVN device 140 calls a phone number mapped to "James."

Figure 10:
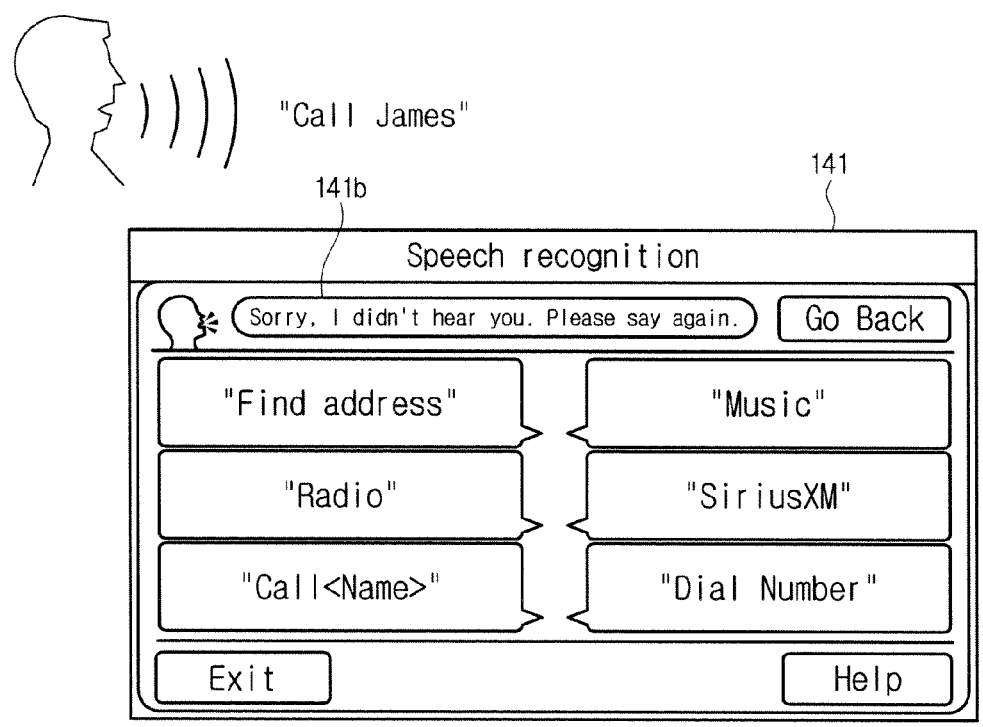
FIG. 10 is a diagram illustrating an exemplary screen that can be displayed on an AVN display when a speech recognition result is rejected.

FIG. 10 is a diagram illustrating an exemplary screen that can be displayed on an AVN display when a speech recognition result is rejected.

When there is no instruction having the confidence score greater than the predetermined threshold value among the found instructions, and the recognition result is rejected, as illustrated in FIG. 10, the AVN display 141 may provide a notification that the recognition result was rejected to the user, and display a message 141b for inducing the speech re-input.

In this case, the recognition environment may be reset. Here, a re-recognized recognition environment may include the accuracy parameter and the threshold value of the confidence score.

When the user re-inputs speech, speech recognition is performed again according to the reset recognition environment. When the re-recognition is completed, the reset recognition environment is reset to the initial value again.

Figure 11:
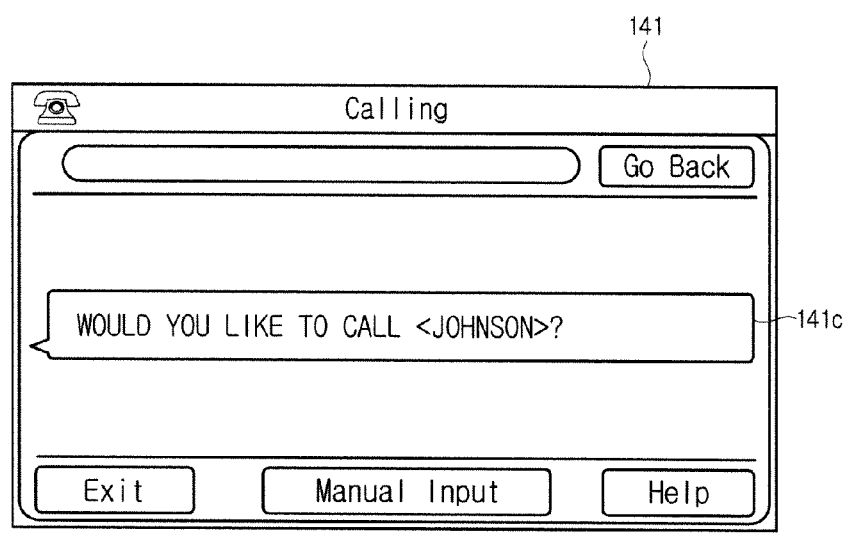
FIGS. 11 and 12 are diagrams illustrating another exemplary screen that can be displayed on an AVN display according to the user's utterance.
Figure 11:
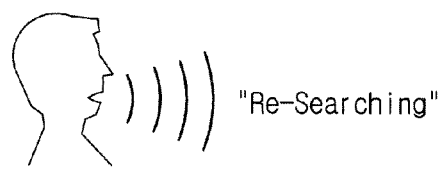
Figure 12:
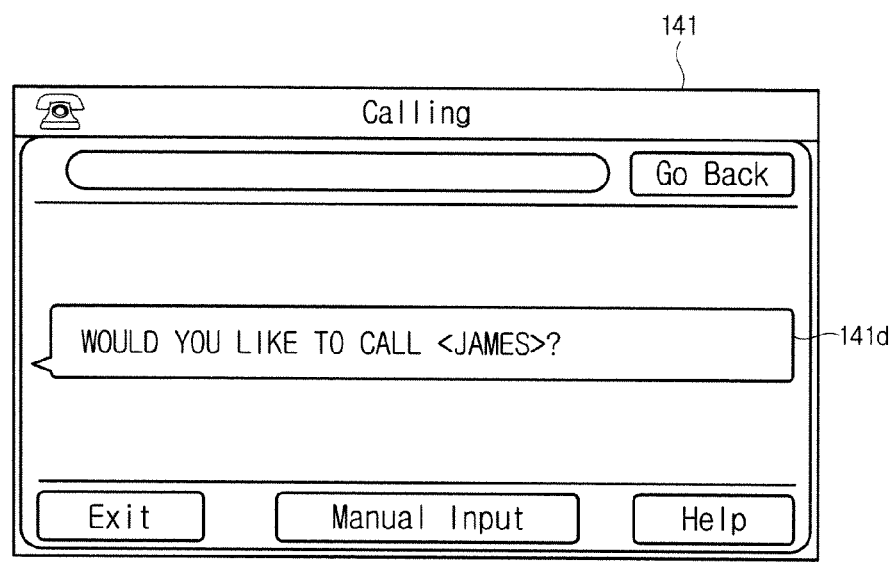
Figure 12:
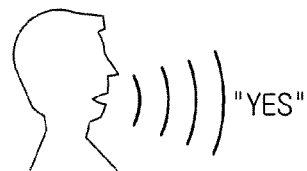

FIGS. 11 and 12 are diagrams illustrating another exemplary screen that can be displayed on an AVN display according to the user's utterance.

As described above, the vehicle 100 may not apply the N-best search method, but may provide one recognition result and receive confirmation from the user. For example, when the instruction recognized in the speech recognition device 120 is "Johnson," as illustrated in FIG. 11, a message 141c for finally confirming whether calling Johnson is performed may be displayed on the AVN display 141.

In this case, when the user utters the re-recognition instruction, the speech recognition device 120 performs the re-recognition as described above, and when the re-recognition is completed, the result is provided to the user again and confirmation is received. For example, when "James" is found by the re-recognition, as illustrated in FIG. 12, a message 141d for finally confirming whether calling James is performed may be displayed, and the user may utter "Yes" and input to the speech input device 110.

When "Yes" is input, the controller 130 may perform control such that the AVN device 140 calls a phone number mapped to "James."

Meanwhile, when an actual instruction of the user is not included in the re-recognition result, the re-recognition instruction may be input again and the re-recognition may be executed again.

In the examples, a case in which the user utters an instruction for calling has been described. However, the above speech recognition process, and particularly, the re-recognition process may be used for other cases in which speech recognition may be applied such as turning on a radio, reproducing a music file, and operating a navigation by searching for a destination.

Hereinafter, an embodiment of a speech recognition method will be described.

Figure 13:
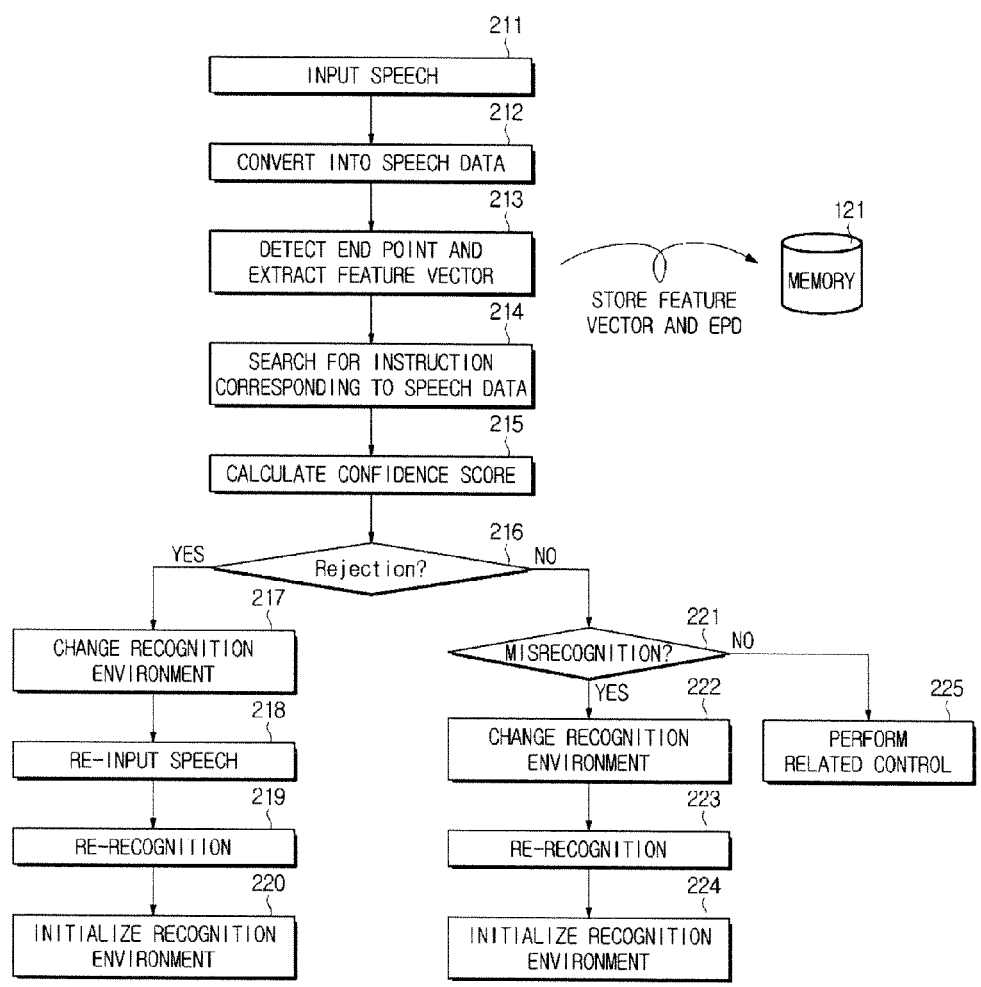
FIG. 13 is a flowchart illustrating a speech recognition method according to an embodiment.

FIG. 13 is a flowchart illustrating a speech recognition method according to an embodiment.

The speech recognition operation performed by the vehicle 100 according to the above embodiment may be applied to the speech recognition method according to the embodiment. Needless to say, the above description may be applied to this embodiment.

As illustrated in FIG. 13, first, an instruction is input by the user (211). Here, speech recognition is assumed to be executed. For example, the user inputs the speech recognition executing instruction by manipulating the input device 162, 142, or 43, and then may input the instruction through speech. The instruction may be input through the speech input device 110 provided in the vehicle 100.

When the instruction is input, the speech recognition device 120 converts the input instruction into the speech data, detects an end point of the speech data, and extracts a feature vector (212). Information on the end point and the feature vector may be stored in the memory 121.

Also, the speech recognition device 120 searches for an instruction corresponding to the speech data using the extracted feature vector (213). A database of the speech recognition engine may be searched for the instruction corresponding to the speech data, and the database may be stored in the memory 121.

After the search, the confidence score is computed to verify the result (215). When the number of found instructions is plural, the confidence score of each instruction is computed. When the all computed confidence scores are smaller than the predetermined threshold value, since it is impossible to ensure the confidence of the recognition result, the result is rejected (Yes in 216).

On the other hand, when any confidence score is greater than the predetermined threshold value (No in 216), the result is not rejected and the final recognition result is provided to the user.

Other implementations are contemplated. For example, the final recognition result may be displayed on the AVN display 141 as text or output as speech through the acoustic output device 143. When the recognition result is rejected, the recognition environment is changed (217). That is, the recognition environment is reset. The reset recognition environment may include at least one of the accuracy parameter and the threshold value of the confidence score.

Also, speech is re-input by the user (218), and recognition of the re-input speech is performed again according to the reset recognition environment (219). When the re-recognition is completed, the reset recognition environment is initialized again (220).

When the recognition result is not rejected but an instruction desired by the user is not included in the final recognition result provided to the user, this corresponds to misrecognition (Yes in 221). Determination of misrecognition may be based on feedback of the user. That is, when the user inputs the re-recognition instruction, it may be determined as misrecognition.

In the event of misrecognition, the recognition environment is changed (222), and the re-recognition is performed (223). However, in this case, the recognition environment to be changed may include the search range in addition to the accuracy parameter and the threshold value of the confidence score. Specifically, the final recognition result provided to the user may be excluded from the search range when the re-recognition is performed.

When the re-recognition is completed, the recognition environment is reset to the initial value again (224).

Meanwhile, when the re-recognition is performed, the final recognition result may be provided to the user according to the confidence value of the recognition result. When he result is rejected again or the re-recognition instruction is input again, the above process may be repeated again.

According to the vehicle and the method of controlling the same, when a user's speech is misrecognized, speech recognition is retried without returning to a previous operation or a re-input of speech, and therefore usability can be increased.

Also, when the user's speech is misrecognized or when re-recognition is performed since the recognized speech is rejected due to a low confidence, a search environment is changed, and therefore accuracy of recognition may be increased.

While the disclosure has been shown and described with reference to certain exemplary embodiments thereof, it will be understood by those skilled in the art that various modifications in form and details may be made therein without departing from the spirit and scope of the disclosure as defined by the appended claims.

What is claimed is:

1. A vehicle comprising:
   a speech input device configured to receive speech;
   a speech recognition device configured to recognize the received speech and output a recognition result of the received speech including a plurality of instruction candidates corresponding to the received speech; and
   at least one of a display configured to display the plurality of instruction candidates or a speaker configured to output the plurality of instruction candidates,
   wherein the speech recognition device resets a recognition environment applied to speech recognition and re-recognizes the received speech when a re-recognition instruction is input by a user, excludes the recognition result of the received speech previously output when the re-recognition is performed, and resets the reset recognition environment to an initial value when the re-recognition is completed,
   wherein the recognition environment includes at least one of an accuracy parameter related to accuracy of speech recognition, a threshold value of a confidence score, or a search range, and
   wherein the accuracy parameter represents information on the number of search nodes, and accuracy of speech recognition increases as the number of search nodes increases.

2. The vehicle according to claim 1, wherein the speech recognition device searches for the plurality of instruction candidates corresponding to the received speech, and outputs an instruction having the confidence score greater than a predetermined threshold value among the found instructions as the recognition result.

3. The vehicle according to claim 1, wherein the speech recognition device resets the accuracy parameter to be higher.

4. The vehicle according to claim 1, wherein the speech recognition device resets the threshold value of the confidence score to be smaller.

5. The vehicle according to claim 1, wherein the speech recognition device converts the received speech into speech data, detects end point information from the speech data to determine a speech section, and extracts a feature vector from the speech section,
and further includes a memory configured to store the detected end point information and the extracted feature vector.

6. The vehicle according to claim 5, wherein, when the re-recognition instruction is input by the user, the speech recognition device re-recognizes the received speech using the end point information and feature vector stored in the memory.

7. The vehicle according to claim 2, wherein, when there is no instruction having the confidence score greater than the predetermined threshold value among the found instructions, the speech recognition device resets the recognition environment applied to speech recognition and recognizes speech re-input by the user according to the reset recognition environment.

8. The vehicle according to claim 7, wherein the recognition environment includes the accuracy parameter related to accuracy of speech recognition and the threshold value of the confidence score.

9. A speech recognition device comprising:
a memory configured to store information on input speech; and
a speech recognition device configured to recognize the input speech and output a recognition result of the input speech, including a plurality of instruction candidates corresponding to a received input speech, to a display or a speaker,
wherein the speech recognition device resets a recognition environment applied to speech recognition and re-recognizes the received input speech when a re-recognition instruction is input by a user, excludes the recognition result of the input speech previously output when the re-recognition is performed, and resets the reset recognition environment to an initial value when the re-recognition is completed,
wherein the recognition environment includes at least one of an accuracy parameter related to accuracy of speech recognition, a threshold value of a confidence score, or a search range, and
wherein the accuracy parameter represents information on the number of search nodes, and accuracy of speech recognition increases as the number of search nodes increases.

10. The device according to claim 9,
wherein the speech recognition device searches for the plurality of instruction candidates corresponding to the input speech, and outputs an instruction having the confidence score greater than a predetermined threshold value among the found instructions as the recognition result.

11. The device according to claim 9,
wherein the speech recognition device resets the accuracy parameter to be higher.

12. The device according to claim 10,
wherein the speech recognition device resets the threshold value of the confidence score to be smaller.

13. The device according to claim 9,
wherein the speech recognition device detects end information from speech data to determine a speech section, and extracts a feature vector from the speech section, and
information on the input speech includes the detected end point information and the extracted feature vector.

14. The device according to claim 13,
wherein, when the re-recognition instruction is input by the user, the speech recognition device re-recognizes the input speech using the end point information and feature vector stored in the memory.

15. A speech recognition method comprising:
recognizing input speech, using a speech recognition device, when speech is input;
outputting a recognition result of the input speech, including a plurality of instruction candidates corresponding to a received input speech, using a display or a speaker;
when a re-recognition instruction is input by a user, resetting a recognition environment including at least one of an accuracy parameter related to accuracy of speech recognition, a threshold value of a confidence score, or a search range, using a speech recognition device;
excluding the recognition result of the input speech output before the re-recognition instruction is input from a search range when the re-recognition is performed, using the speech recognition device;
recognizing the received input speech again by applying the reset recognition environment using the speech recognition device; and
outputting a re-recognition result, excluding the recognition result of the input speech when the re-recognition is performed,
wherein the accuracy parameter represents information on the number of search nodes, and accuracy of speech recognition increases as the number of search nodes increases.

16. The method according to claim 15, further comprising resetting the reset recognition environment to an initial value again when the re-recognition is completed.

17. The method according to claim 15,
wherein the resetting of the recognition environment includes resetting the accuracy parameter to be higher.

18. The method according to claim 15,
wherein the resetting of the recognition environment includes resetting the threshold value of the confidence score to be smaller.

19. A vehicle comprising:
a speech input device configured to receive speech;
a speech recognition device configured to recognize the received speech and output a recognition result of the received speech including a plurality of instruction candidates corresponding to the received speech; and
at least one of a display configured to display the plurality of instruction candidates or a speaker configured to output the plurality of instruction candidates,
wherein the speech recognition device resets a recognition environment applied to speech recognition and re-recognizes the received speech when a re-recognition instruction is input by a user, excludes the recognition result of the received speech previously output when the re-recognition is performed, and resets the reset recognition environment to an initial value when the re-recognition is completed, and
wherein the speech recognition device converts the received speech into speech data, detects end point information from the speech data to determine a speech section, and extracts a feature vector from the speech section,
and further includes a memory configured to store the detected end point information and the extracted feature vector.

20. A speech recognition device comprising:
a memory configured to store information on input speech; and
a speech recognition device configured to recognize the input speech and output a recognition result of the input speech, including a plurality of instruction candidates corresponding to a received input speech, to a display or a speaker,
wherein the speech recognition device resets a recognition environment applied to speech recognition and re-recognizes the received input speech when a re-recognition instruction is input by a user, excludes the recognition result of the input speech previously output when the re-recognition is performed, and resets the reset recognition environment to an initial value when the re-recognition is completed,
wherein the speech recognition device detects end point information from speech data to determine a speech section, and extracts a feature vector from the speech section, and
information on the input speech includes the detected end point information and the extracted feature vector.

* * * * *